Jan. 20, 1942.                C. N. BEBINGER                    2,270,778
                    CONVEYER ANGLE TURN CONSTRUCTION
                     Filed Oct. 31, 1940           2 Sheets-Sheet 1
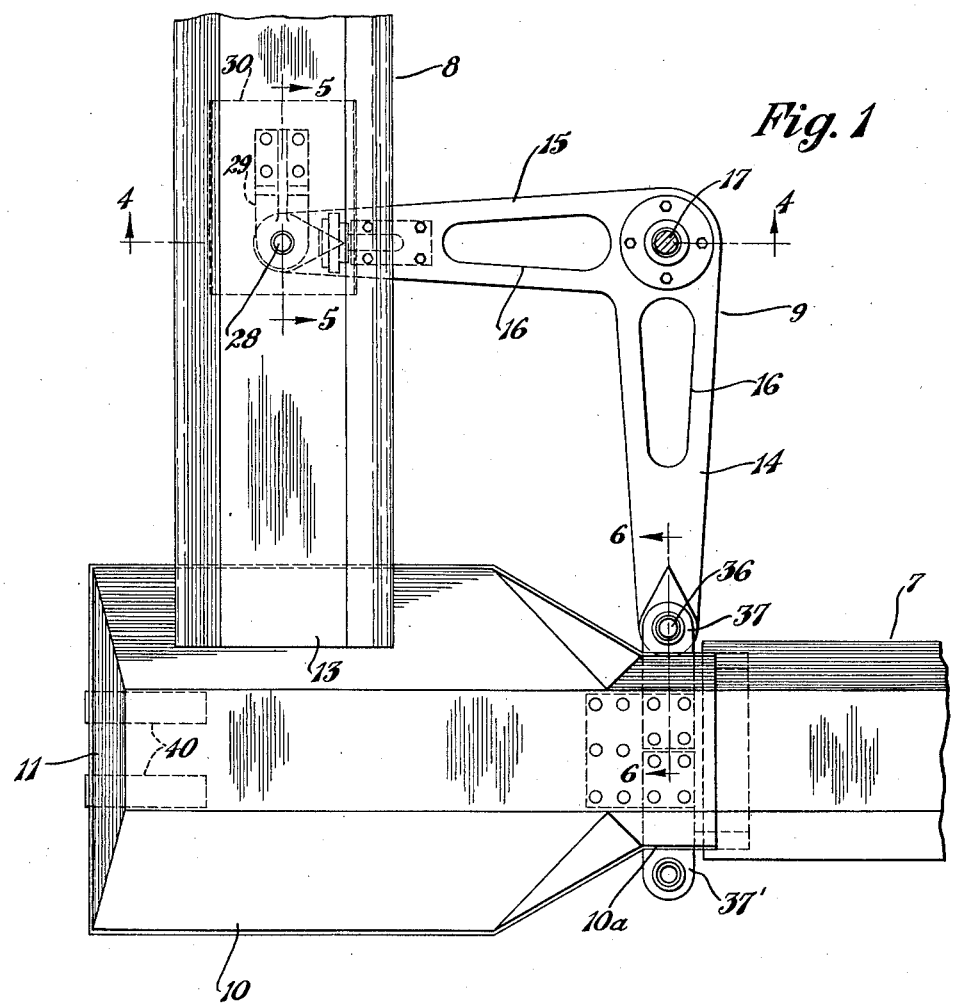
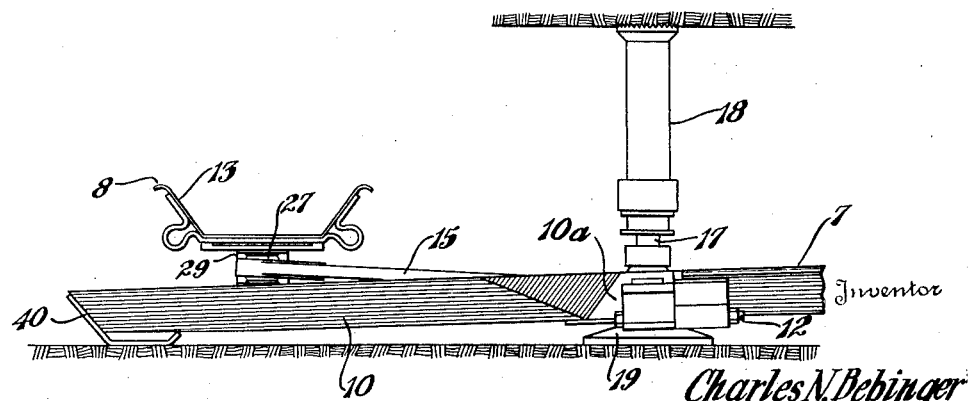
Inventor
Charles N. Bebinger
By Fraser and Bishop
                Attorneys Jan. 20, 1942.  C. N. BEBINGER  2,270,778
CONVEYER ANGLE TURN CONSTRUCTION
Filed Oct. 31, 1940  2 Sheets-Sheet 2
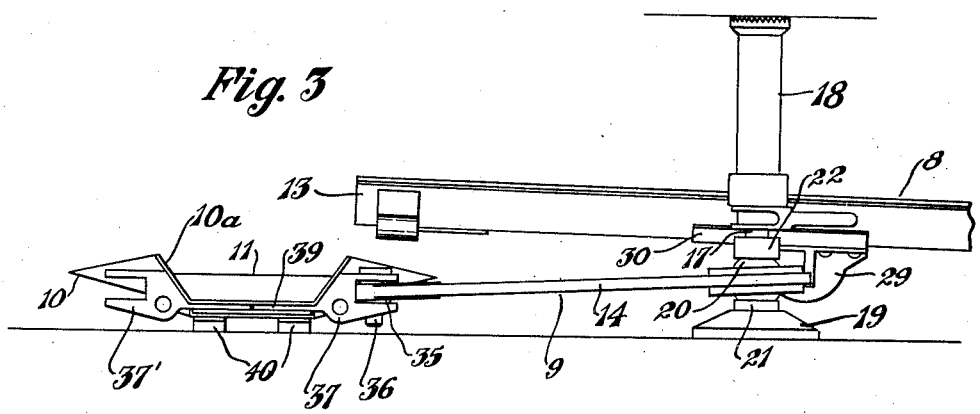
Fig. 3
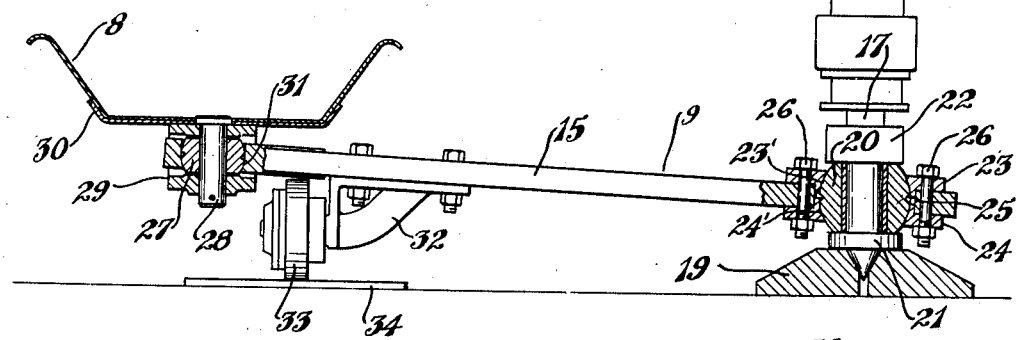
Fig. 4
Fig. 5
Fig. 6
Inventor
Charles N. Bebinger
By Frease and Bishop
Attorneys Patented Jan. 20, 1942

2,270,778

UNITED STATES PATENT OFFICE 2,270,778

CONVEYER ANGLE TURN CONSTRUCTION

Charles N. Bebinger, New Philadelphia, Ohio, assignor to La-Del Conveyor & Manufacturing Company, New Philadelphia, Ohio, a corporation of Ohio Application October 31, 1940, Serial No. 363,603

10 Claims. (Cl. 198—220)

The invention relates generally to angle turns for shaker conveyers, especially as used in coal mining, and more particularly to an improved angle turn construction adapted for the corner of two conveyer troughings, one of which overlaps the other.

The use of shaker conveyers in coal mines requires that the conveyer troughing be turned at an angle at various places, or that the main line of troughing be connected with branch lines at angles thereto, and means must be provided at the turns or corners for supporting the connected ends of both troughings and for transmitting the reciprocating movement of one troughing to the other.

Prior constructions have included two types of angle turns to meet these conditions. One type is the corner pan type, wherein an arcuate conveyer pan closely interfits the ends of the troughings connected, and means is provided for supporting the pan and the troughing ends and for transmitting the conveyer motion from one troughing to the other.

The other type is the overlapping angle turn type, in which the end of one conveyer troughing overlaps the other and extends at an angle thereto, and a bell crank mechanism is provided at the corner angle for supporting the ends of the troughings and transmitting the conveyer motion.

The corner pan type of angle turn is designed for use with a particular angle between troughings and requires extreme accuracy in setting up the troughings, because the angle between them cannot be varied to any substantial extent due to the fact that the pan must interfit closely with the ends of the troughings in order to avoid leakage and spillage of coal at the turn. Consequently, an inaccurate installation wherein the angle between the troughings is not substantially the same as the angle of the pan, results in serious damage to the turn structure when the conveyer is operated, and impairs the reciprocating conveyer motion.

Thus, for every different angle between troughings a different corner pan having substantially the same angle must be provided. Moreover, in many cases it is desirable for a miner to shovel coal directly into the troughing at the turn, and the corner pan provides a relatively restricted section in which to shovel.

The overlapping type of angle turn has included a bell crank lever having a pair of arms supporting the ends of the troughings connected, with the pivot point of the bell crank rigidly supported by a jack or foundation support.

The weight of the troughings is carried on the arms at one side of and spaced from the pivot point, so it is extremely difficult to hold the anchoring jack in position.

Moreover, in this construction each bell crank arm operates at right angles to the axis of the bell crank pivot and is pivoted to the bottom of one of the troughing ends, and the overlapping troughing is necessarily much higher than the other troughing, so that the distance from the bottom of each overlapping troughing to the arm connected thereto is relatively great and causes a lever action tending to misalign and damage the troughing and wear the bell crank mechanism as well as to interfere with the conveyer motion.

These same difficulties have been encountered where a bell crank has been incorporated in a corner pan type of angle turn.

Such prior bell crank overlapping turn constructions are designed for use particularly where the main line of conveyer troughing is extended along the room rib of a mine throughout the full length to which the room is driven, and the overlapping angle turn is located at the loading end of the main line troughing to turn the troughing at angles ranging from somewhat less than 90° to somewhat more than 90° and extending across the mine face, into which face troughing the coal is shoveled or loaded. Accordingly, it is very important to keep the face troughing at minimum height, but the construction of the conventional bell crank and its connections with the conveyer troughings requires a height of the face troughing which is excessive.

It is a general object of the present invention to provide a novel and improved conveyer turn construction which overcomes all of the disadvantages of prior angle turns.

More specifically, it is an object of the present invention to provide a conveyer turn construction which allows considerable variation in angles of turns, and at the same time is easily anchored in place and maintained in alignment and permits maintaining the conveyer troughing at minimum height.

Another object is to provide an improved bell crank angle turn construction in which both ends of the conveyer troughings at the turn are supported from the mine floor so that the bell crank does not carry an unbalanced load.

Another important object is to provide a bell crank conveyer turn construction in which the plane of the bell crank arms is not fixed but is self-adjusting, without disturbing the anchorage of the bell crank pivot, to accommodate varying heights of the conveyer troughings which are connected at the turn.

Another object is to provide a conveyer turn bell crank construction which is adapted for connecting two conveyer troughings at an angle to each other, the lower of said troughings being positioned near to or resting on the mine floor.

A further object is to provide an improved bell crank angle turn construction which is quickly detachable from the conveyer troughings and reversible to fit both right and left angle turns.

A further object is to provide an improved angle turn construction which embodies a wide receiving trough on the main line or driving conveyer at the turn, for receiving coal from the driven or face conveyer without spillage, and for providing increased trough area in which to shovel coal.

A still further object is to provide an improved bell crank angle turn construction in which the angle between the conveyer troughings can be varied greatly more or less than 90° and still avoid spillage of coal and interference with the conveying motion of the troughings.

These, and other objects which will become apparent from the following description together with the accompanying drawings, are accomplished by the improvements comprising the present invention which is defined in the appended claims.

The present invention may be described in general terms as including a conveyer turn having a bell crank universally journaled on a stationary or anchored pivot, with one bell crank arm universally pivoted to the side of a widened receiving trough movably supported on the mine floor and attached to the driving conveyer, the other bell crank arm being universally pivoted to the driven conveyer and movably supported on the mine floor.

Referring to the drawings forming part hereof, in which a preferred embodiment of the invention is illustrated by way of example, Fig. 1 is a plan view of the improved conveyer turn construction connecting the ends of two conveyer troughings at right angles to each other;

Fig. 2 is a side elevation thereof, looking toward the outside of the main or driving conveyer troughing;

Fig. 3 is a side elevation looking toward the inside of the driven or face troughing, the widened receiving trough being shown detached from the driving troughing;

Fig. 4 is an enlarged sectional view partly in elevation as on the line 4—4, Figure 1;

Fig. 5 is an enlarged fragmentary sectional view as on line 5—5, Figure 1; and

Fig. 6 is an enlarged fragmentary sectional view as on line 6—6, Figure 1.

Similar numerals refer to similar parts throughout the drawings.

In the drawings, the receiving end of the main line conveyer troughing of a shaker conveyer is shown fragmentarily at 7, and the delivery end of a line of face conveyer troughing extending at right angles thereto is indicated fragmentarily at 8.

The conveyer troughing 7 is driven with a shaker motion by suitable driving means which may be located at a remote point along the troughing, and this motion is transmitted to the conveyer troughing 8 by means of the bell crank indicated generally at 9, so that the troughing 7 may be called the driving conveyer and the troughing 8 may be called the driven conveyer.

Preferably, the receiving end of the troughing 7 has an extension thereon in the form of a widened receiving pan 10 provided with a closed end wall 11, and the pan is tapered inwardly at its other end to form a portion 10a of reduced width, which is rigidly attached to the receiving end of the troughing 7, as by bolts 12. The width of the receiving pan 10 is preferably not less than one and one-half times the width of each of the conveyer troughings 7 and 8.

The driven conveyer troughing 8 is elevated above the troughing 7, and the delivery end of the troughing 8 overlaps the troughing 7, after the usual fashion of overlapping conveyer turns, for delivering coal from the troughing 8 into troughing 7. In the present improved construction, the delivery end 13 of the troughing 8 overlaps and delivers into the widened portion of receiving pan 10.

The improved bell crank 9 includes two preferably coplanar arms 14 and 15, preferably at right angles to each other, and said arms may have cut out portions 16 for reducing the weight of the bell crank. At the corner or junction of the arms 14 and 15, the bell crank is pivoted on the shaft 17 of an anchoring jack 18, which is supported on a suitable base 19 and is adapted to engage the ceiling of a mine for rigidly securing the jack in place.

As best shown in Fig. 4, the pivoted mounting of bell crank 9 on jack shaft 17 includes a spherical bushing 20 engirdling the shaft between a collar 21 supported on the base 19 and another collar 22 spaced above the collar 21. The bushing 20 is universally journaled in mating flanged bearing plates 23 and 24 which fit in a hole 25 in the corner of the bell crank, and are secured together and to the bell crank by bolts 26. The bearing surfaces 23' and 24' of the bearing plates 23 and 24 respectively, are spherically formed and slidably fit the spherical bushing 20 to provide a universal pivotal mounting for the bell crank on the shaft 17.

The outer end of bell crank arm 15 is pivotally connected to the underside of the end trough of conveyer troughing 8, preferably at a point located centrally of the width thereof. As best shown in Figs. 4 and 5, this pivotal mounting includes a spherical bushing 27 engirdling pivot pin 28 secured in a yoke 29 attached to the bottom of the trough, there being preferably a reinforcing plate 30 interposed between the yoke 29 and the bottom of the trough. The spherical bushing 27 is universally journaled in a hole 31 having a spherical bearing surface and provided in the end of arm 15, to provide a universal pivotal mounting for the arm 15 on the pivot pin 28.

Adjacent to the troughing 8, the arm 15 has secured to its underside a roller bracket 32 on which is journaled, preferably by anti-friction means, a roller 33 for rolling on the mine floor or a floor plate 34, to support the weight of the arm 15 and the end of the troughing 8 pivoted thereto.

The outer end of bell crank arm 14 has universally journaled therein a spherical bushing 35 similar to the spherical bushing 27 in arm 15, for universally pivoting the arm 14 to the driving troughing 7. The spherical bushing 35 journaled in the end of arm 14 engirdles a pivot pin 36, the ends of which are mounted in a bracket yoke 37, which is attached to the side of the reduced end portion 10a of the receiving pan 10. As shown in Fig. 6, the yoke 37 may have a securing flange 39, which extends under and is riveted to the receiving pan, but the universal pivotal connection between the pivot pin 36 and the bell crank arm 14 is located at the side of and above the bottom of the pan.

A similar bracket yoke 37' is secured to the opposite side of the receiving pan 10 for attaching the bell crank arm 14 thereto to accommodate a conveyer turn of the opposite hand.

By connecting the arm 14 to the side of and above the bottom of the pan 10, the pan and the driving troughing connected thereto are maintained at a minimum height, and as shown, the loading end of pan 10 is provided with skids 40 for slidably supporting the pan directly on the floor of the mine. Obviously, rollers can be substituted for the skids 40 if desired.

Thus, the weight of the loading end of the driving troughing is not carried by the bell crank arm 14, and the receiving pan is at a height most suitable for shovelling coal into the same.

The bell crank 9 can be disconnected quickly from the driving troughing 7 merely by removing the pivot pin 36, and from the driven troughing 8 merely by removing the pivot pin 28. When it is desired to use the bell crank on a turn of the opposite hand, all that is necessary is to remove the roller bracket 32 and attach it to the upper side of arm 15, then invert the bell crank and attach the arm 14 thereof to yoke 37' and the arm 15 to the driven troughing extending from the other side of the driving troughing.

By connecting the ball crank arm 14 to the side of the reduced portion 10a of the pan 10, the required length of the bell crank arms 14 and 15 is reduced, and the widened portion of the pan is of sufficient length to permit variation of the angle of the driven troughing 8 to be substantially more or less than 90° to the driving troughing 7, while still permitting the end 13 of the troughing 8 to discharge into the widened portion of said pan so as to avoid spillage.

The improved conveyer turn is easily anchored and maintained in place with a single jack, and operates without causing misalignment of the conveyer troughing or undue wear on the bell crank connections, because substantially none of the trough load is carried by the bell crank arms.

The universal mounting and connection of the bell crank permits the bell crank to adjust itself to accommodate varying heights of the driven conveyer, while maintaining the driving conveyer at a minimum height, without disturbing the anchorage or interfering with the conveyer motion.

Accordingly, the present improved conveyer turn construction overcomes all of the disadvantages of prior angle turns.

I claim:

1. Turn construction for a shaker conveyer including a widened driving trough and an overlapping driven trough extending at an angle thereto, said driving trough having a portion of reduced width at its delivery end, an anchoring member spaced from said troughs, a bell crank universally journaled on said anchoring member and having two arms extending angularly therefrom, means universally pivotally connecting one of said arms to the underside of said driven trough, means on said one arm adjacent said driven trough for independently supporting said arm, and means universally pivotally connecting the other of said arms to the side of the reduced portion of said driving trough, and means for independently supporting said driving trough, the widened portion of said driving trough being of such length as to provide for substantial variation in the angle of the driven trough overlapping said portion.

2. Turn construction for a shaker conveyer including a driving trough and an overlapping driven trough extending at an angle thereto, an anchoring member spaced from said troughs, a bell crank universally journaled on said anchoring member and having two arms extending angularly therefrom, means universally pivotally connecting one of said arms to the underside of said driven trough, means on said one arm adjacent said driven trough for independently supporting said arm, means universally pivotally connecting the other of said arms to the side of said driving trough, and means for independently supporting said driving trough.

3. Turn construction for a shaker conveyer carried on a mine floor, including a driving trough having its loading end closely adjacent to and supported directly on the mine floor, a driven trough overlapping said driving trough loading end and extending at an angle thereto, a jack supported on the mine floor and spaced from said driving and driven troughs, a bell crank universally journaled on said jack and having two angularly extending arms, means universally pivotally connecting one of said arms to the side of said driving trough, means universally pivotally connecting the other of said arms to the underside of said driven trough, and means on said other arm at the driven trough for rollably supporting said arm on the mine floor.

4. Turn construction for a shaking conveyer carried on a mine floor and having overlapping conveyer troughs extending at an angle to each other, the lower of said troughs being supported directly on the mine floor, including an anchoring member spaced from said troughs, a bell crank universally journaled on said anchoring member and having two arms extending angularly therefrom, means universally pivotally connecting one of said arms to the bottom of the overlapping trough, means universally pivotally connecting the other of said arms to the side and above the bottom of said other trough, and means supporting the overlapping trough on the mine floor.

5. Turn construction for a shaker conveyer having a driving trough and a driven trough connected together at an angle, including an anchoring member spaced from said troughs, a bell crank universally journaled on said anchoring member and having two arms extending angularly therefrom, means universally pivotally connecting one of said arms to said driving trough, means universally pivotally connecting the other of said arms to said driven trough, and means on said other arm adjacent said driven trough for independently supporting said arm.

6. Turn construction for a shaker conveyer having two conveyer troughs located at different heights and disposed at an angle to each other, including an anchoring member spaced from said trough, a bell crank universally journaled on said anchoring member and having two coplanar arms extending therefrom at an angle to each other, means universally pivotally connecting one of said arms to one of said troughs, and means universally pivotally connecting the other of said arms to the other of said troughs, the plane of said bell crank arms being inclined from the lower conveyer trough upwardly to the upper conveyer trough.

7. Turn construction for a shaker conveyer including a widened driving trough and an overlapping driven trough extending at an angle thereto, said widened driving trough being supported at its loading end directly on a mine floor and having a portion of reduced width at its delivery end, an anchoring member spaced from said troughs and located in the angle formed by said troughs, a bell crank universally journaled on said anchoring member and having two arms extending angularly therefrom, means universally pivotally connecting one of said arms to the underside of said driven trough, means on said one arm adjacent said driven trough for independently supporting said arm, and means universally pivotally connecting the other of said arms to the side of the reduced portion of said driving trough.

8. Turn construction for a shaker conveyer including a driving trough and an overlapping driven trough extending at an angle thereto, an anchoring member spaced from said troughs, a bell crank universally journaled on said anchoring member inclined to said troughs and having two coplanar arms extending therefrom at an angle to each other, means universally pivotally connecting one of said arms to said driven trough, means associated with said driven trough for independently supporting said trough, means universally pivotally connecting the other of said arms to said driving trough, and means for independently supporting said driving trough.

9. Turn construction for a shaker conveyer including a widened driving trough and an overlapping driven trough extending at an angle thereto, said widened driving trough being supported at its loading end directly on a mine floor and having a portion of reduced width at its delivery end, an anchoring member spaced from said troughs and located in the angle formed by said troughs, a bell crank universally journaled on said anchoring member, and having two arms extending angularly therefrom, means universally pivotally connecting one of said arms to the under side of said driven trough, means associated with said driven trough for independently supporting said trough, and means universally pivotally connecting the other of said arms to the side of the reduced portion of said driving trough.

10. Turn construction for a shaker conveyer having substantially horizontal overlapping conveyer troughs extending at an angle to each other, including an anchoring member spaced from said troughs, a two-arm bell crank universally journaled on said anchoring member and inclined to said troughs, means universally pivotally connecting one bell crank arm to one of said troughs, and means universally pivotally connecting the other bell crank arm to the other of said troughs.

CHARLES N. BEBINGER.